H. W. GIBBS.
INSOLE.
APPLICATION FILED JULY 26, 1915.
1,206,101.                                   Patented Nov. 28, 1916.
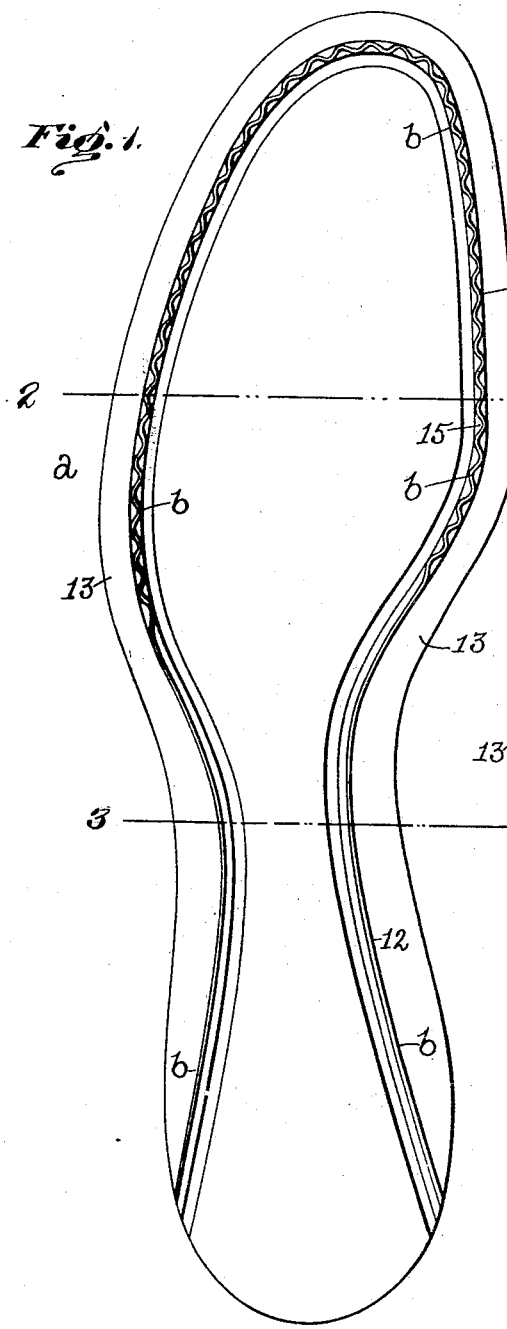
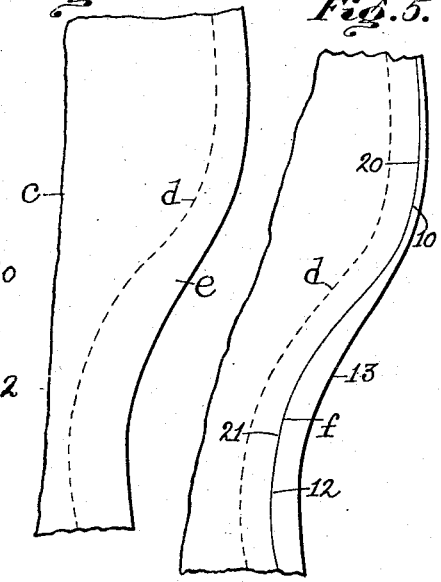
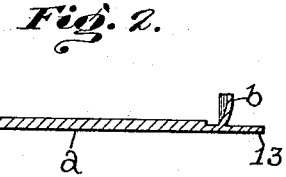
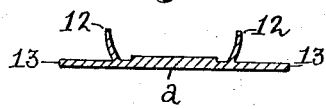
Inventor
Howard W. Gibbs
by Jas. H. Churchill
  Atty.

UNITED STATES PATENT OFFICE.

HOWARD W. GIBBS, OF BOSTON, MASSACHUSETTS, ASSIGNOR TO J. SPAULDING & SONS CO., OF ROCHESTER, NEW HAMPSHIRE, A COPARTNERSHIP COMPRISING EMMA C. SPAULDING AND MARION L. SPAULDING, BOTH OF BOSTON, MASSACHUSETTS, ROLAND H. SPAULDING AND HUNTLEY N. SPAULDING, BOTH OF ROCHESTER, NEW HAMPSHIRE, AND LEON C. SPAULDING, OF BUFFALO, NEW YORK.

INSOLE.

1,206,101.      Specification of Letters Patent.      Patented Nov. 28, 1916.

Application filed July 26, 1915. Serial No. 41,847.

*To all whom it may concern:*

Be it known that I, HOWARD W. GIBBS, a citizen of the United States, residing in Boston, in the county of Suffolk and State of Massachusetts, have invented an Improvement in Insoles, of which the following description, in connection with the accompanying drawings, is a specification, like characters on the drawings representing like parts.

This invention relates to an insole for welted boots and shoes, having a lip and feather and composed of substantially non-stretchable fiber. An insole of this character is shown and described in United States Patent No. 1,135,217 dated April 13, 1915, and its lip is provided with corrugations or transverse crimps to take up the surplus stock in the lip and enable the latter to remain in a substantially upright position with relation to the body portion of said insole.

In insoles for welted boots and shoes, the lip at each side of the insole is made in the form of a reverse curve, with the center of the curve at the forepart of the insole on the inside of the lip and with the center of the curve at the shank portion on the outside of the lip, and as it is desirable and practically necessary that the lip should be of uniform height at both the forepart and shank and practically throughout its length, according to present methods of insole manufacture, more stock is removed from the slitted portion of the shank than from the forepart, and owing to the substantially non-stretchable nature of the fiber, it is difficult to provide the lip with corrugations or transverse crimps at the shank portion without tearing, splitting or breaking the lip at the shank portion, as the lip at the shank portion is turned up into a curve of greater radius than when the lip is flat, whereas in the forepart, the lip in its flat condition is of a curvature of greater radius than when turned up.

To avoid tearing, breaking or splitting of the lip at the shank portion, and thereby form a lip of different curvatures, which may be continuous or unbroken, when the lip is composed of substantially non-stretchable fiber, the fore part of the lip is provided with transverse corrugations or crimps, as heretofore practised, to take care of the surplus stock in the lip, while the shank portion of the lip is left without transverse corrugations and is preferably subjected to pressure so as to compress the shank portion of the lip sufficiently to permit the edge of the lip to be brought into a curve of greater radius and be retained in such curved form and thereby form an uncrimped or smooth lip at the shank portion of the insole, which enables the fiber insoles to be produced in a minimum time by machines employing rapidly-operated tools.

The particular features of the invention will be pointed out in the claims at the end of this specification.

Figure 1 is a plan view of a fiber insole embodying this invention. Fig. 2, a section on the line 2—2, Fig. 1. Fig. 3, a section on the line 3—3, Fig. 1. Figs. 4 and 5, details of a portion of the insole blank.

Referring to the drawing, *a* represents an insole for use in welted boots and shoes and made from pliable substantially non-stretchable fiber, preferably chemically-treated or hard fiber. The insole *a* is provided with a lip *b*, which is formed by slitting a flat blank or insole *c* at its edge to the depth of the dotted line *d* to form a flap *e* (see Fig. 4), cutting the flap *e* so as to form a narrower flap *f*, which is of uniform or substantially uniform width throughout the length of said flap and especially at the fore part 10 and shank 12, and then turning up the flap *f* into a position substantially at right angles to the feather 13 and body portion of the insole, and providing the forepart 10 of the lip *b* with transverse crimps or corrugations 15 and leaving the shank portion 12 of said lip smooth or uncorrugated.

By reference to Fig. 5, it will be seen that the flat flap *f*, which forms the lip *b*, has its outer edge at each side of the insole blank in the form of a reverse curve, comprising two curves 20, 21, which may be designated respectively the forepart curve and the shank curve. It will be noticed that the forepart curve 20 has its center on the innerside of the flap *f* and the shank curve 21 on the outside of said flap, consequently when the flap $f$ at the forepart is turned up to form the forepart of the lip $b$, the radius of the forepart of the lip is shortened and the base of the forepart of the lip where it joins the body portion forms a curve of shorter radius than the curve of the forepart of the flap $f$, and as a result a surplus of material is present in the forepart 10 of the lip $b$, which is taken care of by the transverse corrugations 15, which enable the forepart of the lip to remain in the upright position into which it is turned and in which it is desired and required that it should remain, in order to enable the insole to be used in the manufacture of welted boots and shoes with the machines now commonly found in shoe factories. On the other hand, it will be noticed that the shank curve 21 has its center on the outside of the flap $f$, consequently when the latter, at the shank portion of the insole, is turned up to form the shank portion 12 of the lip $b$, the radius of the shank portion is lengthened and the base of the shank portion of the lip, where it joins the body portion forms a curve of greater radius than the curve of the shank portion of the flap $f$, and as a result, the surplus of material is taken up by this increased curvature, at least in part and to such extent, that if the shank portion of the lip be transversely corrugated or crimped, the strain upon the substantially non-stretchable fiber is such as is liable to cause the lip to be torn, broken or split at one or more places and an imperfect insole produced, which is liable to not only weaken the boot or shoe at the shank portion and result in an imperfect shoe, but also interfere with the successful operation of the sewing machines. On the other hand, by leaving the shank portion 12 of the lip without transverse corrugations for the whole or a portion of its length as represented in Fig. 1, sufficient stock is present in the shank portion of the lip to enable the latter to be turned up into the curve of greater radius without being broken, split or torn transversely, which is assisted by subjecting the shank portion of the lip to pressure, which is of sufficient force to compact and compress the fiber of the shank portion of the lip and thus insure that it is capable of being brought or turned up into the upright position desired, and to remain permanently in such position. The pressure to which the shank portion 12 of the lip is subjected may be effected by a suitable machine employed for forming the lip.

It will therefore be seen that an insole of substantially non-stretchable fiber may be provided with a lip which is continuous or unbroken and of different curvatures, notwithstanding the substantially non-stretchable nature of the fiber from which the insole is made, and that the insole shown in Fig. 1 can be used as a satisfactory substitute for leather insoles in welted boots and shoes. In the present instance, the shank portion 12 is left uncrimped from at or near the ball portion of the insole to the heel thereof, and while this may be preferred, it is not desired to limit the invention in this respect.

Claims:

1. An insole for welted boots and shoes composed of substantially non-stretchable fiber and provided with a lip having a fore part curved about a center on the inner side of the lip and transversely corrugated or crimped, and having a shank portion curved about a center outside of the lip and free from transverse corrugations or crimps for a major portion of its length.

2. An insole for welted boots and shoes composed of substantially non-stretchable-chemically-treated fiber and provided with a lip having a fore part curved about a center on the inner side of the lip and transversely corrugated or crimped, and having a shank portion curved about a center outside of the lip and free from transverse corrugations or crimps for a major portion of its length.

3. An insole for welted boots and shoes composed of substantially non-stretchable fiber and provided with a lip having a transversely crimped fore part curved about a center on the inner side of the lip and having a smooth compressed uncrimped shank portion which is curved about a center outside of said lip.

4. An insole for welted boots and shoes provided with a lip having a transversely crimped or corrugated fore part curved about a center on the inner side of the lip and having a shank portion which is free from transverse corrugations or crimps for a major portion of its length and is curved about a center outside of the lip.

In testimony whereof, I have signed my name to this specification.

HOWARD W. GIBBS.